No. 622,592. Patented Apr. 4, 1899.
E. M. BERGER.
IRIS MECHANISM.
(Application filed Aug. 22, 1898.)
(No Model.) 2 Sheets—Sheet 1.
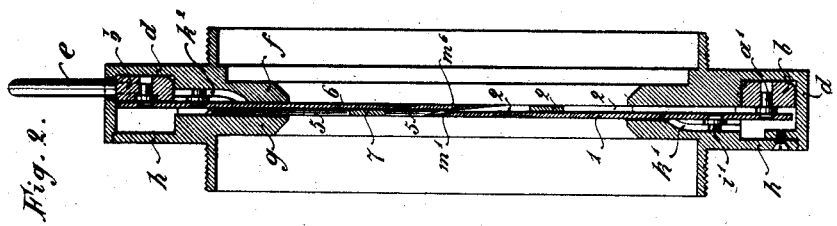
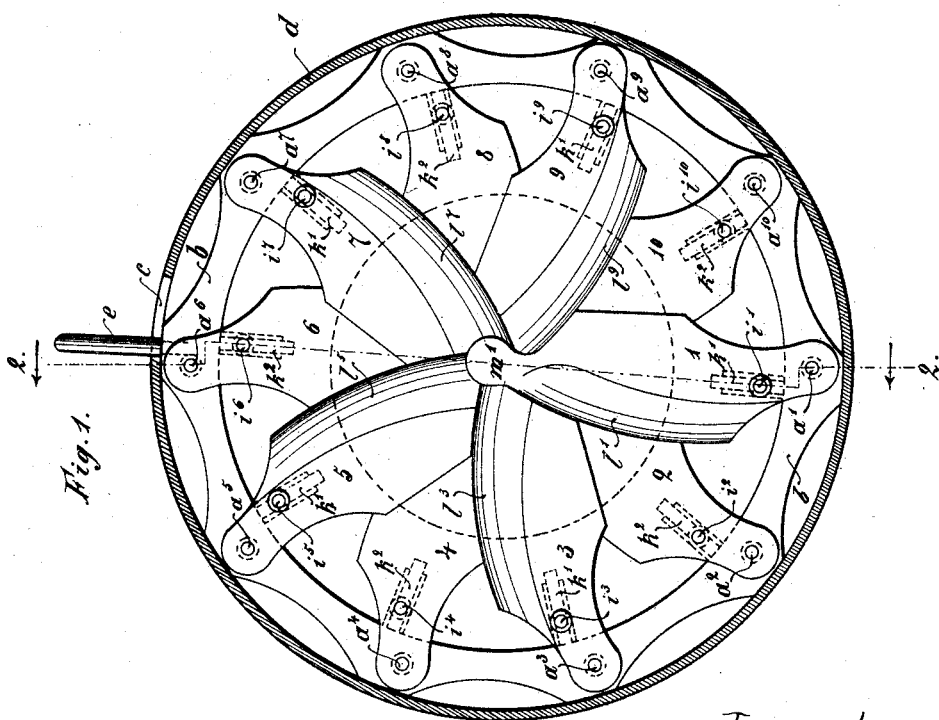
Witnesses:
Inventor:
Ernst M. Berger No. 622,592. Patented Apr. 4, 1899.
E. M. BERGER.
IRIS MECHANISM.
(Application filed Aug. 22, 1898.)
(No Model.) 2 Sheets—Sheet 2.
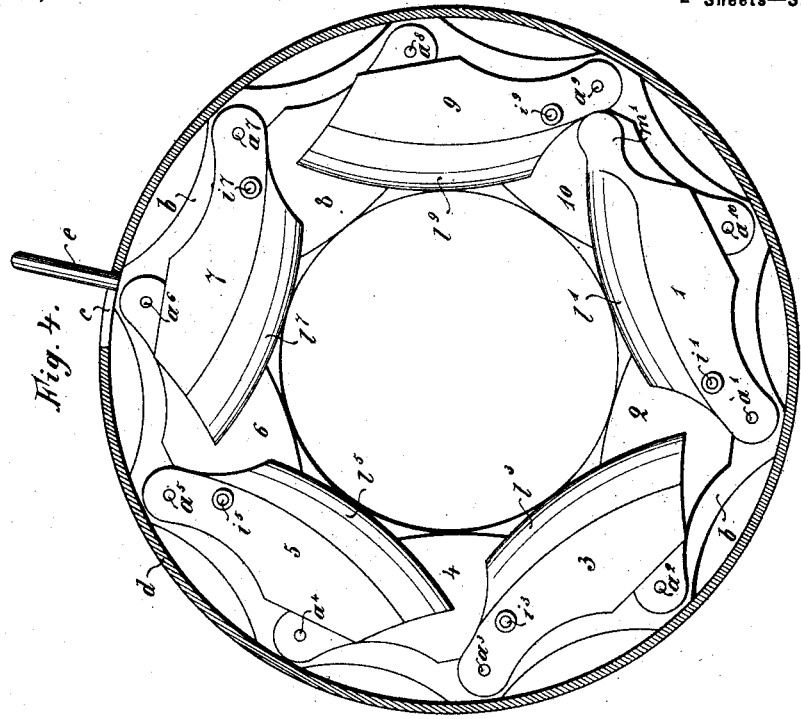
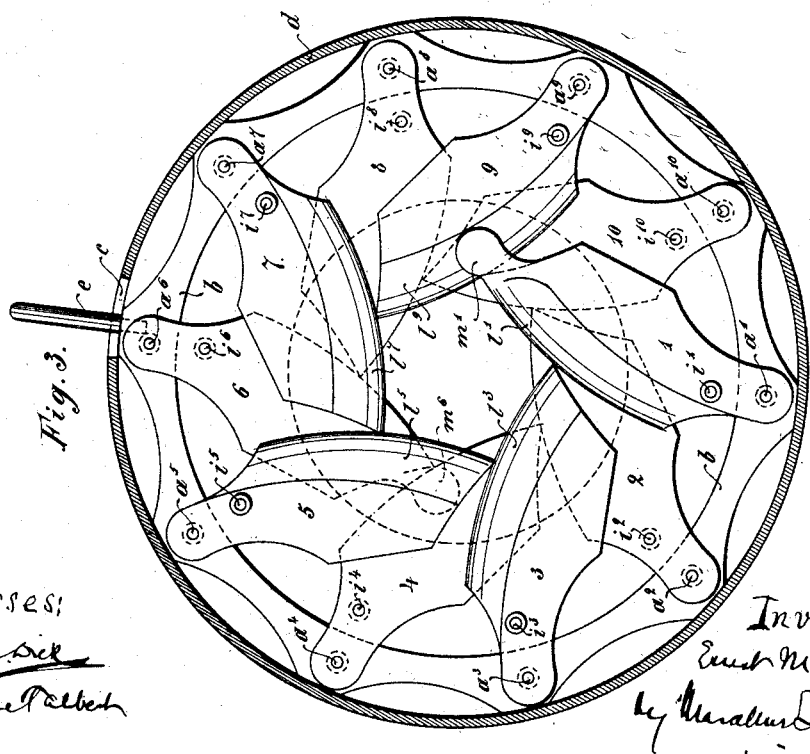
Witnesses: Inventor:

UNITED STATES PATENT OFFICE.

ERNST MAX BERGER, OF JENA, GERMANY, ASSIGNOR TO THE FIRM CARL ZEISS, OF SAME PLACE.

IRIS MECHANISM.

SPECIFICATION forming part of Letters Patent No. 622,592, dated April 4, 1899.

Application filed August 22, 1898. Serial No. 689,167. (No model.)

*To all whom it may concern:*

Be it known that I, ERNST MAX BERGER, engineer, a subject of the King of Saxony, residing at Jena, Grand Duchy of Saxe-Weimar, Germany, have invented new and useful Improvements in Iris Mechanisms, of which the following is a specification.

The invention consists in an improved iris mechanism for use in optical apparatus and instruments.

The improved iris may be arranged either so that its aperture cannot be reduced further than to a fixed minimum value or so that it is capable of being completely closed. Therefore it may be used in any lens system as a diaphragm the aperture of which is adjustable, or it may serve as a shutter for photographic objectives, or, finally, it may be combined with a photographic-lens system, so as to serve for both purposes simultaneously. This iris is of very simple construction, and consequently cannot easily become inoperative. Furthermore, requiring but little space in the direction of the optical axis, it is well adapted for being inserted between the lenses of a photographic double objective. To attain these purposes, the iris consists of two annular groups of wings or blades arranged one behind the other. The blades of both groups or halves of the iris are mounted to swing in the same direction of rotation, and the blades of each half always cover the gaps between the blades of the other half. The blades composing an annular half of the iris lie all in one single plane and are swung in this plane. On one side their plane surfaces are in contact in the median plane of the total iris with the plane surfaces of the blades of the other half, so as to produce a continuous circumference of the total aperture. The iris is very thin, as the blades of each half do not overlap each other nor are otherwise superposed, as in former iris mechanisms.

With an iris constructed as described, the adjustable aperture may be confined by a closed line which lies in one single plane perpendicular to the optical axis, and therefore presents an identical aperture not only for the rays which are parallel to the axis, but also for all oblique rays. For this purpose the blades where they surround the aperture are beveled at their outer side, so as to form sharp edges lying all in the above-mentioned median plane of the iris. In case of a totally-closing iris (an iris-shutter) the central gap which remains when both halves of the iris are closed is covered by a disk-like lid formed on the free end of one of the blades or of one blade in each half.

The four figures of the annexed drawings represent the invention as applied to a totally-closing iris.

Figure 1 is a section through the iris-casing perpendicular to the optical axis and shows both halves closed. Fig. 2 is an axial section on line 2 2 of Fig. 1. Fig. 3 is a section similar to Fig. 1, but both halves of the iris being opened to form an aperture of middle size. Fig. 4 is a like section showing the iris fully open.

In the example shown each half of the iris is composed of five blades, the blades of one half being designated by the odd numbers 1 3 5 7 9 and the blades of the other half by the even numbers 2 4 6 8 10. All ten blades, by means of pins $a'$ to $a^{10}$, provided at their outward ends, engage with holes of the driving-ring $b$. A slot $c$ in the casing $d$ allows the operating-pin $e$ of the driving-ring to project outwardly. The pins $a^2$ $a^4$ $a^6$ $a^8$ $a^{10}$ do not prevent the blades 2 4 6 8 10 from sliding upon the driving-ring $b$ and upon the inner rim $f$ of the casing $d$, while the pins $a'$ $a^3$ $a^5$ $a^7$ $a^9$ hold the blades 1 3 5 7 9 at a distance apart from the driving-ring and the said rim which is equal to the thickness of the blades 2 4 6 8 10, so that the blades of each half of the iris guide each other by means of their plane-surfaces lying in the common plane of contact. (In the median plane of the total iris.) The blades 1 3 5 7 9 slide with their outward surfaces upon the inner rim $g$ of the cover $h$ of the casing. For swinging the blades relatively to the driving-ring $e$ when this ring is shifted each blade engages, by means of a second pin, with a guiding-groove arranged on the casing. The pins $i^2$ $i^4$ $i^6$ $i^8$ $i^{10}$ of the even-numbered blades engage with the grooves $k^2$ $k^4$ $k^6$ $k^8$ $k^{10}$ in the casing $d$, and the pins $i'$ $i^3$ $i^5$ $i^7$ $i^9$ of the odd-numbered blades engage with the grooves $k'$ $k^3$ $k^5$ $k^7$ $k^9$ in the cover $h$. The edge of each blade is partly beveled, as shown at $l'$ to $l^{10}$, so that the sharp edges of all blades coöperate to form a closed bordering-line for the aperture, all parts of this line being situated in the median plane of the iris. Blades 1 and 6 carry at their inner ends disk-like extensions or lids $m'$ and $m^6$, respectively, which are designed to cover the central gap of the closed iris and are beveled or form a shoulder at the inner side, so as not to interfere with the beveled outer surfaces of the adjacent blades overlapped by them.

What I claim as my invention, and desire to secure by Letters Patent of the United States, is—

1. In an iris mechanism the combination with the casing and the driving-ring, of two annular groups of iris-blades arranged one behind the other, so that the blades of each group cover the gaps between the blades of the other group, and guiding and pivoting means connecting the blades of both groups with the casing and the driving-ring so that by a rotary movement of the driving-ring all blades are swung in the same direction, substantially as described.

2. In an iris mechanism the combination with the casing and the driving-ring, of two annular groups of iris-blades arranged one behind the other, the blades of each group covering the gaps between the blades of the other group and lying in one single plane in contact with the blades of the other group, and guiding and pivoting means connecting the blades of both groups with the casing and the driving-ring so that by a rotary movement of the driving-ring all blades are swung in the same direction, substantially as described.

3. In an iris mechanism the combination with the casing and the driving-ring, of two annular groups of iris-blades arranged one behind the other, the blades of each group covering the gaps between the blades of the other group and lying in one single plane in contact with the blades of the other group and all blades coöperating to confine the iris-aperture by means of sharp edges lying in the plane of contact common to both groups of blades, and guiding and pivoting means connecting the blades of both groups with the casing and the driving-ring so that by a rotary movement of the driving-ring all blades are swung in the same direction, substantially as described.

In testimony whereof I have hereunto set my hand in presence of two subscribing witnesses.

ERNST MAX BERGER.

Witnesses:
RUDOLPH FRICKE,
HERM. BRAKAND.